United States Patent
Lasko

[15] 3,700,109
[45] Oct. 24, 1972

[54] APPARATUS FOR REMOVING FLOATING LIQUIDS FROM THE SURFACE OF A BODY OF WATER

[72] Inventor: Charles J. Lasko, 4344 Washington Road, Parlin, N.J. 08859

[22] Filed: Dec. 23, 1970

[21] Appl. No.: 101,016

[52] U.S. Cl.............................210/242, 210/DIG. 21
[51] Int. Cl............................C02b 9/02, E02b 15/04
[58] Field of Search.....210/83, 242, DIG. 21, 62, 97, 210/105, 101

[56] References Cited

UNITED STATES PATENTS

| | | |
|---|---|---|
| 2,497,177 | 2/1950 | McClintock et al. ...210/242 X |
| 3,303,932 | 2/1967 | Hirs et al. .............210/242 X |
| 1,591,024 | 7/1926 | Dodge.....................210/242 |
| 1,007,647 | 10/1911 | Darnall.....................210/62 |
| 3,276,588 | 10/1966 | Nehrbass et al. ..........210/169 |
| 3,556,297 | 1/1971 | Harrington.................210/83 |
| 3,245,539 | 4/1966 | Earle........................210/242 |
| 3,623,609 | 1/1971 | Ainlay......................210/242 |

Primary Examiner—Samih N. Zaharna
Assistant Examiner—T. A. Granger
Attorney—Samuelson & Jacob

[57] ABSTRACT

Apparatus for skimming liquids, such as oil, having a specific gravity less than that of water from the surface of a body of water including a pair of laterally spaced hulls supporting a basin between them and a skimming edge immediately ahead of the basin, the hulls including fore and aft chambers and means for admitting or expelling water independently into or out of each chamber to select the level and the fore and aft tilt of the hulls relative to the surface of the body of water so as to enable skimmed liquid to pass over the skimming edge and into the basin.

9 Claims, 4 Drawing Figures

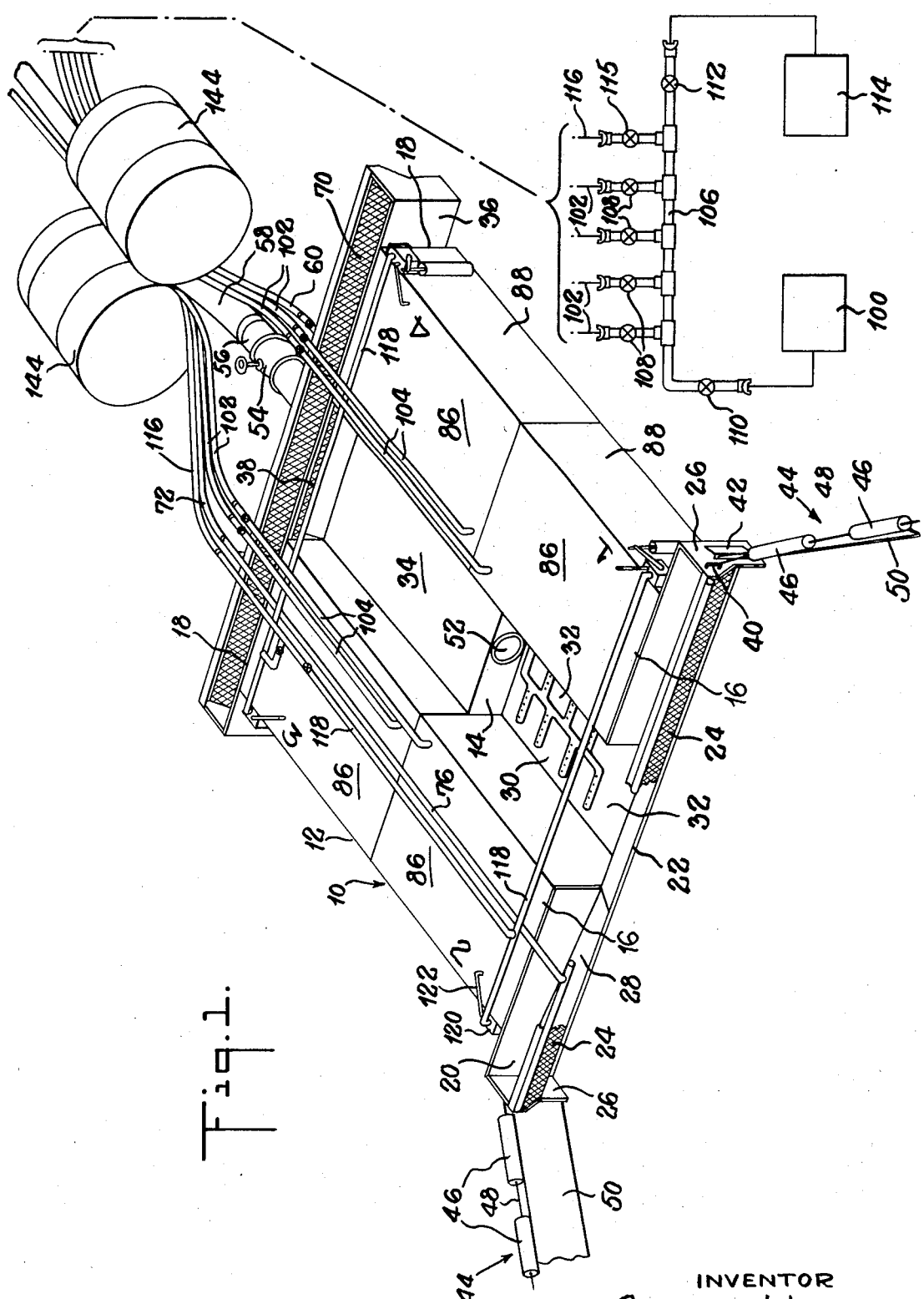

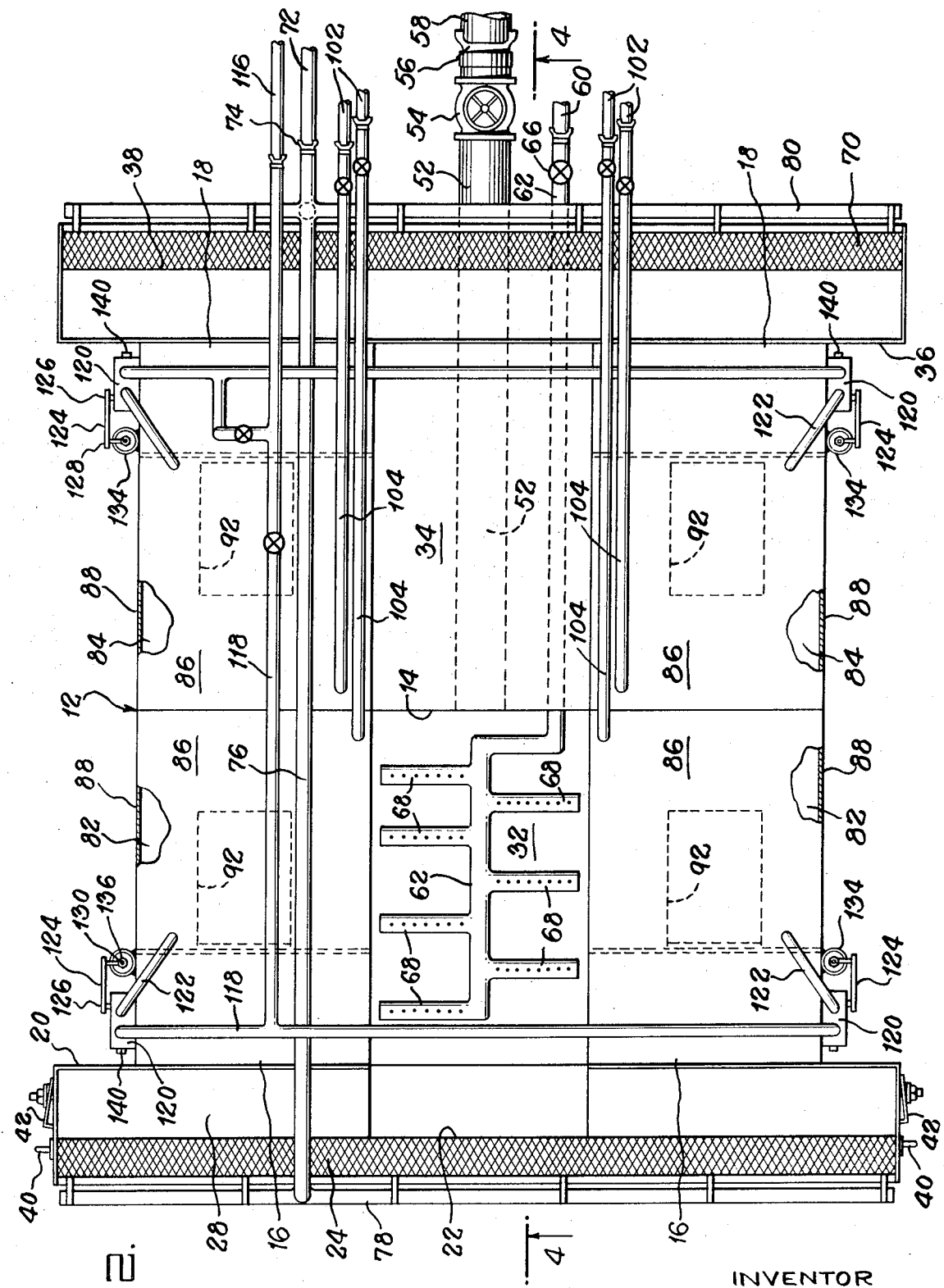

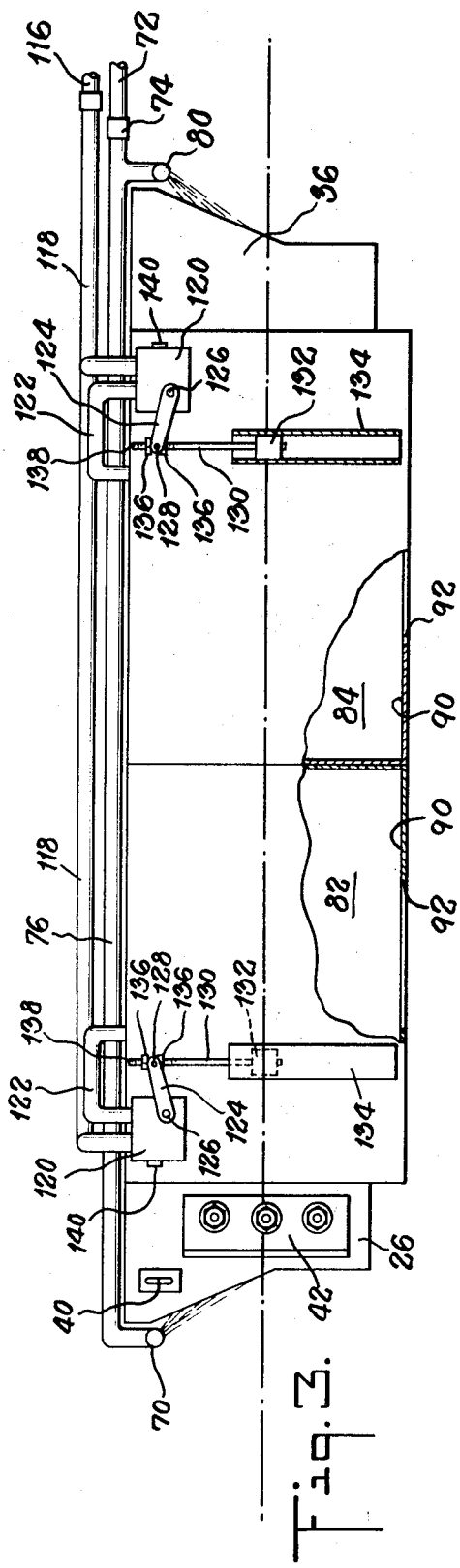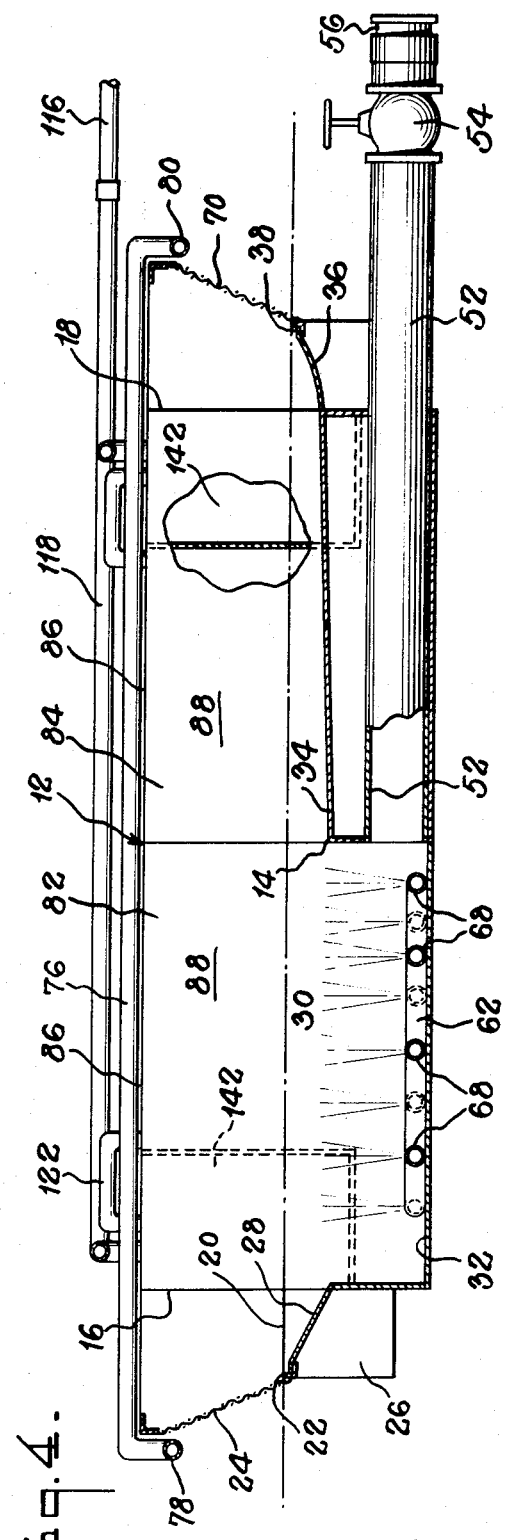

APPARATUS FOR REMOVING FLOATING LIQUIDS FROM THE SURFACE OF A BODY OF WATER

Reference is made to Disclosure Document Ser. No. 002,186 filed May 22, 1970 which discloses subject matter related to the invention described herein.

The present invention relates generally to apparatus for removing liquids, such as oil, having a specific gravity less than that of water from the surface of a body of water and pertains, more specifically, to an apparatus for skimming such liquids from the water and either carrying the the skimmed liquid away or treating the liquid with dispersing agents and returning the treated liquid to the body of water.

The present emphasis upon the preservation and improvement of our environment through the science of ecology has given rise to a great many developments in the control and the elimination of pollution. One type of pollution which has become particularly aggravated in the past few years is that of oil and other liquid spills which contaminate the surface of oceans, lakes and rivers and wreak havoc upon the ecology of such bodies of water and their surroundings.

In addition to the damage done by such chemical spills, the loss of the spilled liquids themselves results in a loss to the owner of the spilled liquid of a valuable commodity It would therefore be advantageous to have available a relatively inexpensive apparatus which could be operated easily and economically to remove such spilled liquids from the surface of the body of water on which the liquids are spilled and to even recover such liquids.

It is therefore an important object of the invention to provide an apparatus which will remove floating liquids, such as oil, from the surface of a body of water and which will either recover or disperse such liquids, continuously and in relatively large amounts.

Another object of the invention is to provide an apparatus which requires no engine or other instrumentality which may present a danger in the environment of the liquids being recovered or dispersed and which minimizes the hazard to operating personnel.

Still another object of the invention is to provide an apparatus which removes floating liquids from the surface of a body of water by skimming and in which the level of skimming is selective, either manually or by predetermined adjustment of automatic leveling means so as to seek and hold its own skimming level.

A further object of the invention is to provide an apparatus of the type described above which may be utilized in a wide range of climatic conditions and for a wide variety of floating liquids.

A still further object of the invention is to provide an apparatus for skimming liquids from the surface of a body of water, the apparatus being compact and portable so as to be useful in streams and rivers, as well as in lakes and oceans and so as to be deployed easily for effective operation in almost any body of water.

Another object of the invention is to provide an apparatus of the type described above which is economically fabricated and easily operated with a minimum number of personnel.

The above objects, as well as still further objects and advantages, are attained by the invention which may be described briefly as apparatus for skimming liquids, such as oil, having a specific gravity less than that of water from the surface of a body of water, the apparatus comprising a pair of hulls extending longitudinally between a forward end and an aft end and spaced apart laterally for floating upon the body of water, a longitudinal basin supported between the hulls, means communicating with the basin adjacent the forward ends of the hulls and including a skimming edge forward of the basin, the hulls each including a forward chamber and an aft chamber, each chamber including a top, sides and a bottom, an opening at the bottom of each chamber for admitting water from the body of water to the chambers, and means for selectively providing gas under pressure to the top of each chamber for independently regulating the level of the water in each chamber to select the level and the fore and aft tilt of the hulls relative to the surface of the body of water so as to enable skimmed liquid to pass over the skimming edge and into the basin. Means are provided communicating with the basin adjacent the aft ends of the hulls and including an aft edge normally located at approximately the same vertical level as the skimming edge such that the skimmed liquid may pass over the skimming edge, through the basin, and out of the basin over the aft edge. Means may also be provided for introducing a further fluid into the skimmed liquid as such liquid passes through the basin.

The invention will be more fully understood while still further objects and advantages will be more apparent in the following detailed description of an embodiment of the invention illustrated in the accompanying drawing, in which:

FIG. 1 is a perspective view of an apparatus constructed in accordance with the invention;

FIG. 2 is a top plan view of the apparatus;

FIG. 3 is a side elevational view of the apparatus; and

FIG. 4 is a longitudinal cross-sectional view taken along line 4—4 of FIG. 2.

Referring now to the drawing, and especially to FIG. 1 thereof, an apparatus constructed in accordance with the invention is illustrated generally at 10 and is seen to include a pair of longitudinally extending hulls 12 spaced apart laterally and supporting a basin 14 therebetween. Each hull 12 has a forward end 16 and an aft end 18. A trough 20 extends laterally across the forward ends 16 of the hulls 12 and includes a forward skimming edge 22 which, by virtue of the lateral extent of the trough 20, extends laterally over substantially the entire width of the apparatus 10.

Assuming now that apparatus 10 is to be used for removing oil floating upon a body of water, the hulls 12 are adapted to float upon the body of water and at a depth which will place the skimming edge 22 below the surface of the oil, thereby enabling the oil to flow into the trough 20. A forward screen 24 is provided for screening out debris which might otherwise enter the trough 20. Referring now to FIGS. 2, 3 and 4, as well as to FIG. 1, the trough 20 includes end plates 26 and a bottom 28 which funnels the skimmed oil from the skimming edge 22 into the basin 14. The basin includes a forward portion in the form of a sump 30 which has a bottom 32 lying vertically well below the skimming edge 22. The aft portion of the basin 14, which lies behind the sump 30, is in a form of a spill deck 34 extending aft to an aft trough 36 having an aft edge 38 which lies vertically at the same level as the forward skimming edge 22, the spill deck 34 being at a level intermediate the level of the bottom 32 of the sump 30 and the level of the skimming edge 22 and the aft edge 38, for purposes which will be described hereinafter.

In order to further enhance the ability of the apparatus 10 to gather oil, the end plates 26 of the trough 20 are each provided with an eye 40 and a clamp 42 to which there may be attached an oil boom 44 illustrated in FIG. 1 in the form of a plurality of floats 46 mounted upon a cable 48 affixed to each eye 40 and a depending skirt 50 affixed to each clamp 42 to serve as a fence for directing oil from a larger surface area toward the skimming edge 22 and into the trough 20. Oil which is thus directed to the sump 30 may be removed from the sump through an outlet conduit 52 which communicates with the sump 30 and carries an outlet valve 54. Beyond the outlet valve 54 is a snap-on hose coupling 56 to which there may be connected a drain hose 58 extending back to the shore or to a larger vessel carrying a pump (not shown) which will pump the oil from the sump 30 of the apparatus 10 to remote recovery tanks (not shown). In this manner, apparatus 10 may serve as an oil recovery unit, the skimmed oil being removed from the sump 30 and retained in remote oil storage tanks.

Where it is not desired to collect the skimmed liquid, and where it is feasible to merely disperse or otherwise treat the skimmed liquid rather than collect the liquid, the outlet valve 54 may be shut and a supply line 60 may be connected to a supply pipe 62 at a coupling 64, the supply pipe 62 including a supply valve 66 and terminating in perforated distributor arms 68 lying at the bottom 32 of the sump 30. A dispersing agent may be supplied to the supply line 60 to be distributed through the perforated arms 68 into the skimmed liquid in the sump 30 so as to be mixed therewith. The mixture of the dispersing agent and the skimmed liquid will then be carried over the spill deck 34 to pass over the aft edge 38 through an aft screen 70 and out of the apparatus. Where it is desired to aerate the skimmed liquid, air may be supplied to the distributor arms 68 through supply line 60. Thus, any desired treating fluid may be introduced into the skimmed liquid by supplying the treating fluid to the supply line 60. In this manner, apparatus 10 is employed as a spillway for treating skimmed liquids and returning the liquid to the body of water in a condition which allows the skimmed liquid to be dispersed or otherwise treated and thereby rendered more tolerable.

In addition to supply line 60, a further supply line 72 may be connected by means of a coupling 74 to a further supply pipe 76 communicating with a forward manifold 78 located adjacent the forward screen 24, and an aft manifold 80 located adjacent the aft screen 70. When apparatus 10 is employed in the skimming of relatively thick and viscous liquids such as heavy oils, especially in cold weather, steam may be supplied to the manifold 78 to be sprayed upon the screen 24 such that the screen and the liquids passing through the screen will be heated to facilitate the flow of the heavy liquids. When the apparatus is used as a spillway for dispersing skimmed liquids, dispersing agents may be supplied to both manifolds 78 and 80, as well as to the distributor arms 68 for maximum effectiveness in supplying dispersing agents to the skimmed liquids. In addition, by connecting the supply line 60 to a source of compressed air, a blast of air may be provided at each manifold 78 and 80 to clear the screens 24 and 70 during skimming operations.

Proper operation of the apparatus 10 requires that the level of the skimming edge 22 be accurately set and maintained. In addition, it is important to accurately maintain a prescribed fore and aft tilt, or attitude. For example, when the apparatus is employed in the mode where liquid is accumulated in the sump 30 and drawn from the sump through the outlet conduit 52, it would be more effective to tilt the apparatus forward so that the skimming edge 22 is lower than the aft edge 36 and liquid will drain into the sump 30 to be drawn off through the outlet conduit 52. On the other hand, when apparatus 10 is used in the mode where liquid merely passes through the apparatus and is either aerated or treated with a dispersing agent, the apparatus should be maintained in a level, horizontal attitude so that the skimming edge 22 and the aft edge 36 are at approximately the same vertical level. In addition, some skimming operations may be carried out with the apparatus in a level, or horizontal attitude, so that the skimmed liquid may pass over both the forward skimming edge 22 and the aft edge 38 to pass into the sump 30. In order to regulate the overall buoyancy of the apparatus, as well as the fore and aft angular attitude thereof, each hull 12 is divided into fore and aft chambers 82 and 84, respectively. Each chamber 82 and 84 has an air and water tight top 86 and sides 88 and includes a bottom 90 having an opening 92 therein through which water may pass from the body of water into each chamber. The relationship between the amount of water and the amount of air in each chamber 82 and 84 will determine the buoyancy of each chamber and hence will determine the depth at which the apparatus 10 will float and the attitude of the apparatus.

Where it is feasible and desirable to operate apparatus 10 manually, such as where the apparatus is placed in a small stream, canal or pond, or where the apparatus is operated from a large barge, air, or a similar gas such as nitrogen, may be supplied under pressure from a source 100 (see FIG. 1) through air supply lines 102 to air supply pipes 104 communicating with each chamber. The source 100 of pressurized air may be an air compressor or a tank of compressed air or other gas at a remote location. A manually operated manifold 106 enables an operator to selectively pass compressed air from the source 100 into any one of the chambers 82 or 84 or vent air from any one of the chambers, thereby regulating the level of water within that particular chamber and regulating the buoyancy of the chamber. Thus, the manifold 106 is provided with four independent valves 108 for independently passing compressed air into each air line 102 from the source of compressed air through an inlet valve 110 or for venting air from each chamber through its respective air line 102 by closing the inlet valve 110 and opening a vent valve 112 to vent 114. It will be apparent that by varying the buoyancy of the forward two chambers 82 relative to the aft two chambers 84 the fore and aft tilt of apparatus 10 may be manually adjusted.

Apparatus 10 may also be used in an automatic mode where a preset buoyancy (and attitude) can be maintained without manual operations. In the automatic mode, the air valves 108 and the vent valve 112 are closed and the automatic air supply valve 115 is opened to open the automatic air supply line 116 to the source 100. The automatic air supply line 116 is connected, via air pipes 118, to each of four three-way valves 120, one valve 120 being associated with each chamber 82 and 84 and communicating with that chamber through a connecting conduit 122. Each three-way valve 120 is actuated by a lever 124 mounted at one end 126 for pivotal movement and affixed at the other end 128 to a rod 130 carrying a float 132 which is free to move vertically upwardly or downwardly within a tubular guide 134 affixed to the side of the hull 12. The position of the lever 124 relative to the float 132 may be adjusted by adjusting the location of the nuts 136 which hold the end 128 of the lever in place upon the threaded end 138 of rod 130. Depending upon the vertical position of the float 132, the three-way valve 120 will either pass compressed air from the automatic air supply line 116 through the conduit 122 and into the corresponding chamber 82 or 84, or will enable air to be vented from the chamber through the conduit 122 and out a vent 140, or will merely shut off the air supply and the vent to preserve a constant buoyancy in the chamber. In this manner, the buoyancy of each chamber 82 and 84 may be maintained automatically by merely presetting the level of the float 132 so that the proper depth and attitude of apparatus 10 will be maintained automatically.

Each chamber 82 and 84 is provided with an inner flotation chamber 142 which is entirely watertight so that in the event of any malfunction which would allow water to fill the remainder of the chamber 82 or 84, the inner chamber 142 will provide a minimal buoyancy for keeping the apparatus afloat.

The numerous air lines, supply lines and outlet lines are preferably supported by pontoons 144 placed behind the apparatus 10 so that the buoyancy and attitude of the apparatus will not be affected by the weight of these various lines.

It will be apparent that the described apparatus requires no operating personnel on the apparatus itself, nor does it require any engines, pumps or other machinery which may present a hazard in the environment of the liquid being skimmed. All operations may be performed at a safe distance from the apparatus and may be performed either automatically or manually. The apparatus is versatile in that it may be used as a skimming device, as a holding basin, or as a spillway and may be made in a variety of sizes and shapes for varying degrees of portability and various volumes of operation.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for skimming liquids, such as oil, having a specific gravity less than that of water from the surface of a body of water, said apparatus comprising:
   a pair of hulls extending longitudinally between a forward end and an aft end and spaced apart laterally for floating upon said body of water;
   a longitudinal basin supported between the hulls;
   means communicating with the basin adjacent the forward ends of the hulls and including a skimming edge forward of the basin;
   the hulls each including a forward chamber and an aft chamber, each chamber including a top, sides and a bottom;
   an opening at the bottom of each chamber for admitting water from said body of water to the chambers;
   means for selectively providing gas under pressure to the top of each chamber for independently regulating the level of the water in each chamber to select the level and the fore and aft tilt of the hulls relative to the surface of the body of water so as to enable skimmed liquid to pass over the skimming edge and into the basin;
   means communicating with the basin adjacent the aft ends of the hulls and including an aft edge normally located at approximately the same vertical level as the skimming edge such that the skimmed liquid may pass over the skimming edge, through the basin, and out of the basin over the aft edge; and
   means for introducing a further fluid into the skimming liquid as such liquid passes through the basin.

2. The apparatus of claim 1 wherein the basin includes a sump extending vertically below the level of the skimming edge and into which the skimmed liquid will pass.

3. The apparatus of claim 2 including means communicating with the sump for allowing the skimmed liquid to be drawn from the sump and to be passed out of the apparatus.

4. The apparatus of claim 2 wherein said means which includes the skimming edge comprises a trough affixed adjacent the forward end of the hulls and extending laterally over substantially the entire width of the device such that the skimming edge extends beyond the lateral extent of the basin and substantially across the entire width of the apparatus.

5. The apparatus of claim 1 including means responsive to the level of the hulls relative to the surface of the body of water for maintaining the hulls at a predetermined selected level in the body of water and the skimming edge at a prescribed level.

6. The apparatus of claim 5 wherein said means responsive to the level of the hulls include valve means associated with each of the chambers for regulating the flow of gas to that chamber, and actuating means responsive to the depth of the hulls in the water for actuating the valve means to either admit gas into or vent gas from the chamber.

7. The apparatus of claim 6 wherein the valve means include a three-way valve associated with each chamber, and the actuating means include a float associated with each valve, and means for selecting the position of the float relative to the valve to select the level of the hulls in the body of water.

8. Apparatus for skimming liquids, such as oil, having a specific gravity less than that of water from the surface of a body of water, said apparatus comprising:
- a pair of hulls extending longitudinally between a forward end and an aft end and spaced apart laterally for floating upon said body of water;
- a longitudinal basin supported between the hulls;
- means communicating with the basin adjacent the forward ends of the hulls and including a skimming edge forward of the basin;
- the hulls each including a forward chamber and an aft chamber, each chamber including a top, sides and a bottom;
- an opening at the bottom of each chamber for admitting water from said body of water to the chamber;
- means for selectively providing gas under pressure to the top of each chamber for independently regulating the level of the water in each chamber to select the level and the fore and aft tilt of the hulls relative to the surface of the body of water so as to enable skimmed liquid to pass over the skimming edge and into the basin;
- the basin including a sump extending vertically below the level of the skimming edge immediately aft of the skimming edge and extending longitudinally over only a portion of the length of the basin for receiving the skimmed liquid;
- means communicating with the basin adjacent the aft ends of the hulls and including an aft edge located at approximately the same vertical level as the skimming edge; and
- a deck extending between the sump and the aft edge at a vertical level intermediate the bottom of the sump and the aft edge.

9. The apparatus of claim 8 including means for introducing a further fluid into the sump.

* * * * *